No. 867,188. PATENTED SEPT. 24, 1907.
C. H. CLARK & H. F. HAMILTON.
HORSE HOE AND CULTIVATOR.
APPLICATION FILED JULY 31, 1906.
2 SHEETS—SHEET 1.
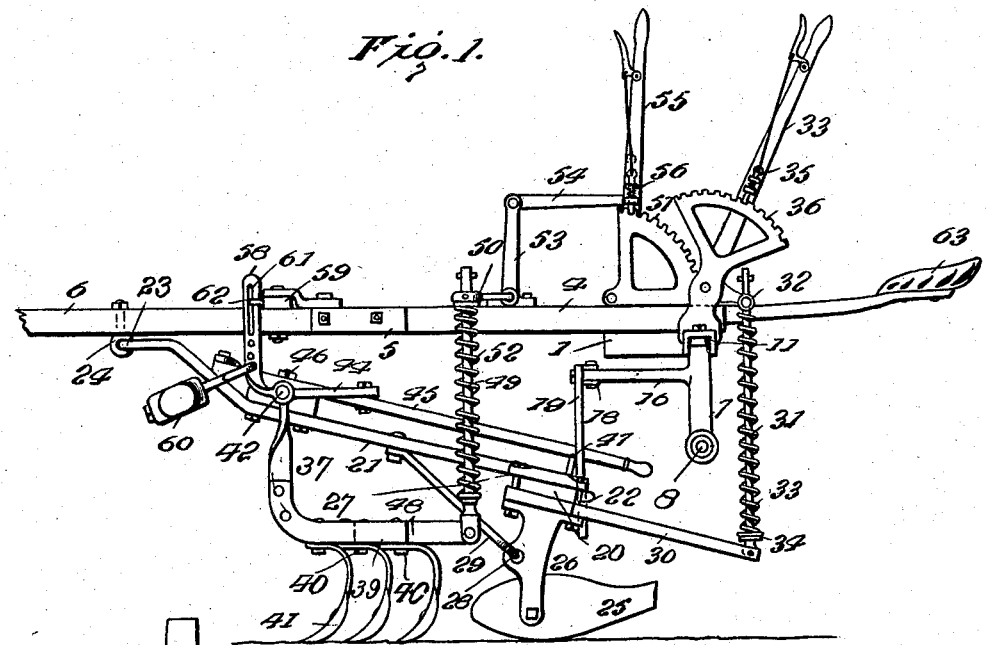
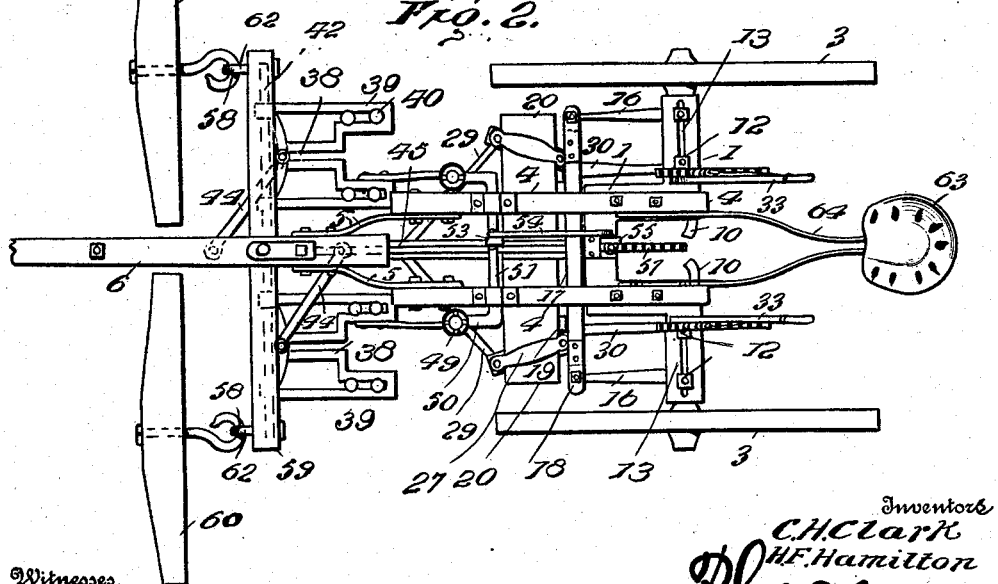
Inventors
C. H. Clark
H. F. Hamilton No. 867,188.　　　　　　　　　　　　　　PATENTED SEPT. 24, 1907.
C. H. CLARK & H. F. HAMILTON.
HORSE HOE AND CULTIVATOR.
APPLICATION FILED JULY 31, 1906.
2 SHEETS—SHEET 2.
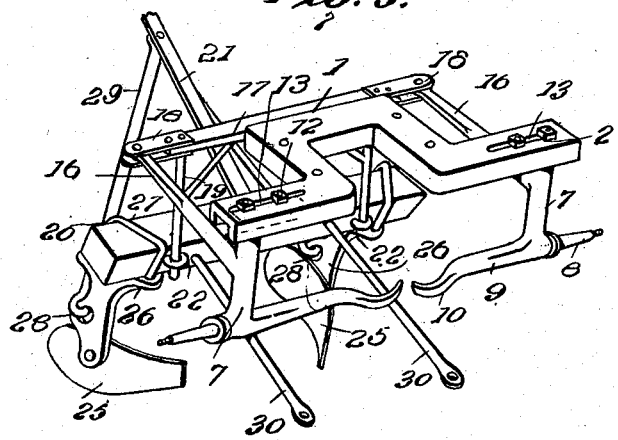
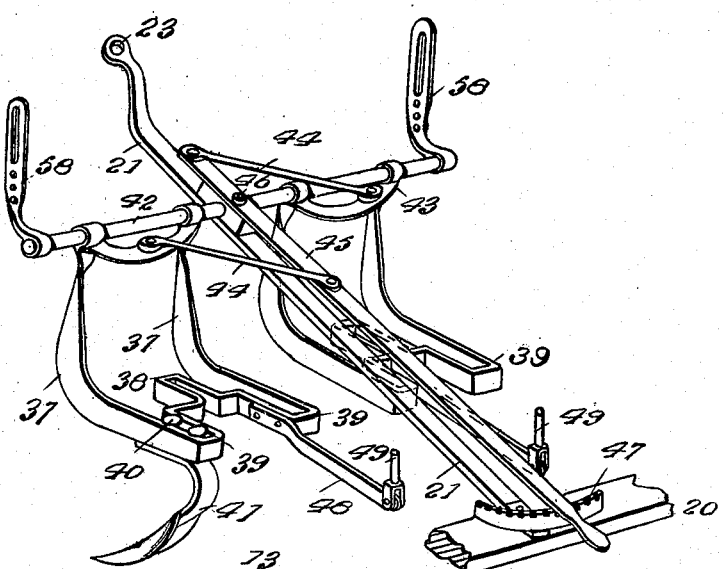
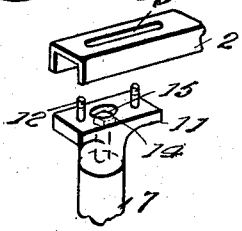
Witnesses
Inventors
C. H. Clark
H. F. Hamilton
By
Attorneys

UNITED STATES PATENT OFFICE.

CHARLES H. CLARK AND HOWARD F. HAMILTON, OF SPRAGUES MILL, MAINE; SAID HAMILTON ASSIGNOR TO SAID CLARK, OF EASTON, MAINE.

HORSE-HOE AND CULTIVATOR.

No. 867,188.  Specification of Letters Patent.  Patented Sept. 24, 1907.

Application filed July 31, 1906. Serial No. 328,601.

*To all whom it may concern:*

Be it known that we, CHARLES H. CLARK and HOWARD F. HAMILTON, citizens of the United States, residing at Spragues Mill, in the county of Aroostook and State of Maine, have invented certain new and useful Improvements in Horse-Hoes and Cultivators, of which the following is a specification.

The purpose of this invention is to devise an agricultural implement combining in one structure a horse-hoe which will admit of both operations of cultivating and horse-hoeing being accomplished at one time, or separately as may be desired, the machine being at all times under control of the operator and the actuating devices being in front and under observation and control.

The machine is of such construction as to be equally well adapted for corn, potatoes or other crops and to be adjusted according to the nature of the surface so as to equalize the cultivation and hoeing upon level or sloping ground.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a combined cultivator and horse-hoe constructed in accordance with the invention, the wheel on the inner side being omitted. Fig. 2 is a top plan view of the implement. Fig. 3 is a perspective view of the main frame, the support for the hoes and the standards provided with the wheel, spindles and the foot rest. Fig. 4 is a detail perspective view of the two cultivator frames and the supporting and adjusting means coöperating therewith. Fig. 5 is a detail perspective view of the upper portion of one of the steering standards and an end portion of the main frame, the parts being separated.

Corresponding and like parts are referred to in the following description and indicated in all the views of the drawings by the same reference characters.

The main frame is indicated at 1 and is approximately of U-shape and has opposite outer extensions 2 for reception of the upper ends of the steering standards. The outer extensions 2 are in transverse alinement to enable the wheels 3 to come opposite, thereby equalizing the strain and load upon the frame and adjunctive parts of the opening. Bars 4 are secured at their rear ends to the longitudinal or side members of the frame 1 and extend in parallel relation and have their flat ends connected by means of strap irons 5 and to the pole or tongue 6. The bars 4 overlap the side members of the frame 1 and are preferably bolted thereto.

The steering standards 7 have connection at their upper ends with the outer extensions 2 of the main frame in a manner to admit of their turning about a vertical axis to provide for properly directing the machine as it is drawn or otherwise propelled over the field. A spindle or axle arm 8 projects outward from the lower end of each standard 7 and receives a ground wheel 3. An arm 9 projects inward from each standard 7 and terminates in a foot rest 10. The arms 8 and 9 extend in opposite directions from a standard and are preferably an integral part thereof to obviate the formation of joints which add to the cost of manufacture and are liable to become loose when subjected to vibration and strain.

A block 11 is secured to each extension of the main frame and is preferably adjusted to admit of varying the distance between the standards 7 according as it may be required to move the ground wheels 3 to bring them closer together or further apart to suit varying distances between the rows of plants to be cultivated and hoed. Bolts or like fastenings 12 secure the blocks to the extensions 2 and pass through slots 13 formed therein. Upon loosening the fastenings 12, the blocks and standards may move laterally to regulate the distance between the ground wheels 3 and after the latter have been adjusted they are made fast by retightening said fastenings. Each standard is connected to its block 11 in a way to admit of its turning when it may be required to change the direction of the machine either to vary from a direct course or to turn at the end of a row preliminary to recrossing the field. As shown most clearly in Fig. 5, the standard is provided at its upper end with a stem 14 which is fitted into a vertical opening formed in the block 11, said stem being provided at its upper end with a stop 15 to retain the standard and block against casual displacement or separation. The opening in the block 11 receiving the stem 14 is enlarged at its upper end to receive the stop 15 to prevent interference thereof with the part 2.

An arm 16 projects forward from each standard 7 and has connection with a cross bar 17 so as to insure simultaneous and like movement of the two standards and ground wheels. The cross bar 17 is provided at opposite ends with spaced plates 18 which are attached to the upper and lower sides thereof in any substantial manner and which projects beyond the extremities of said cross bar and receive between their projecting ends the front end of the arm 16. The connection between the plates 18 and arm 16 is such as to admit of pivotal movement between them when turning the standards 7 to give proper direction to the implement. The cross bar 17 is free, that is, it has no direct connection with the frame, thereby admitting of its moving freely with the arms 16 when the standards 7 are turned to change the direction of movement of the implement. Guide rods 19 are attached at their upper ends to the cross bar 17 and are pendent therefrom and serve to move the cultivating and hoeing devices to compel them to follow the direction of movement of the machine when changing its course. A beam 20 located some distance below the cross bar 17 and connected with the pole or tongue by means of a draft bar 21, is mounted to move vertically upon the guide rods 19. Keepers 22 made fast to the beam 20 receive the guide rods 19 and hold the beam thereto and cause both the cross bar 17 and beam 20 to move laterally either to the right or to the left, while admitting of the beam 20 having free vertical movement, whereby provision is had for raising and lowering the hoe blades and the cultivator gangs. The draft bar 21 is secured at its rear end to the beam 20 in any substantial manner and its front end 4 is bent upward and forward and terminates in an eye 23 which receives an eye-bolt 24 by means of which the draft bar 21 is connected to the pole or tongue 6 in a manner to admit of the beam 20 moving laterally and vertically.

A hoe blade 25 is provided for each end of the beam 20 and has connection therewith. The rear portions of the hoe blades curve inwardly so as to throw the soil upon the plants immediately in the rear of the cultivator shovels. Each hoe blade is attached to the lower end of a standard 6, the latter being firmly attached at its upper end to the beam 20 in a manner to provide for lateral adjustment of the hoe blades according to the size of the plants to be worked. A clip 27 connects each standard 26 with the beam 20 and upon fastening said clip, the standard 26 and hoe blade 25 may be moved laterally or upon the beam 20 to vary the distance between the two hoe blades. Each standard 26 is widened, an opening 28 being formed in the widened portion to receive the rear end of a brace 29 whose front end is attached to the draft bar 21. A bar 30 extends rearward from each end portion of the beam 20 and its outer end is connected to a vertical rod 31 which passes loosely through an arm 32 of a lever 33 mounted upon the main frame. A coil spring 33 is mounted upon the rod 31 and is confined between a stop 34 near the lower end of the rod 31 and the arm 32 so as to exert a downward pressure upon the bar 30 and hold the hoe blade in contact with the ground with a greater or less pressure according to the tension of the spring 33 which is regulated by varying the position of the lever 33. A latch bolt 35 fitted to the lever 33 and coöperating therewith, is adapted to engage a notch or tooth of a segment 36 and hold the lever 33 in the adjusted position.

It will be understood that there are two levers 33 and two sets of adjunctive parts coöperating therewith and with the bars 30, hence by adjusting the levers 33, the hoe blade upon one side of the machine may be subjected to a greater pressure than the hoe blade upon the opposite side, or both hoe blades may be acted upon by a like pressure according to the nature of work and the condition of the surface of the ground. Upon level ground, both hoe blades will be subjected to equal pressure, but upon sloping ground, such as the side of a hill, the levers 33 will be adjusted to admit of the hoe blades adapting themselves to the pitch of the surface with the result that the hoe blade on the up side will be elevated, whereas the hoe blade on the low side will be depressed.

The cultivators are provided in two gangs, each gang being arranged upon one side of the implement. The frame of a cultivator gang comprises beams 37 and intermediate loop-shaped portions 38 and 39 which are adapted to receive the fastenings 40 by means of which the cultivator shovels 41 are connected thereto. The loop-shaped portions 39 extend rearward, whereas the loop-shaped portions 38 project forward, thereby admitting of the cultivator shovels being employed in gangs. A transverse rod 42 is firmly connected intermediate of its ends to the draft bar 21 and its end portions receive and support the cultivator gangs, which are connected thereto in a manner to admit of the gangs having free lateral and vertical adjustment. The forward ends of the beams 37 terminate in eyes through which the rod 42 passes. Tie bars 43 connect the upper forward ends of the beams 37 to brace the same as well as to provide convenient means for connection of links 44 with the respective cultivator gangs. A lever 45 is pivotally connected to the draft bar 21 at 46 and its rear end extends within convenient reach of the driver's seat and is adapted to engage with a tooth or notch of a curved bar 47 secured to the beam 20 at a medial point. The links 44 are pivotally connected at their inner ends with the lever 45 equidistant upon opposite sides of the fulcrum or pivot support 46 so that movement of the rear end of the lever 45 will effect a corresponding movement of the cultivator gangs to bring them together or to force them apart as may be required to adapt the cultivator gangs to the work in hand. A bar 48 projects rearward from each cultivator frame and the lower end of a vertical rod 49 is pivotally connected thereto, the upper end of said rod 49 passing loosely through an opening in the end of an arm 50 at the end of a rod or shaft 51 arranged transversely of the machine and mounted in bearings fitted to the longitudinal bars 4. A spring 52 is mounted upon each rod 49 and is confined between a stop at the lower end of the rod and the arm 50 and is adapted to exert a downward pressure upon the cultivator frame to hold the shovels in the ground when the machine is in operation. An arm 53 projects upward from the shaft or rod 51 and is connected at its upper end by means of a link 54 with a lever 55, the latter being provided with the usual latch bolt 56 to coöperate with a toothed segment 57 to hold the lever 55 and the cultivator gangs in the required adjusted position. A clevis 58 connects each end of the transverse rod 42 with a swingle-tree 59 mounted upon the rear portion of the pole or tongue 6. Swingle-trees 60 are connected by short chains with the clevises 58 and the beam is hitched thereto in the accustomed manner. The clevises 58 are adapted to have a limited play and for this purpose each is provided with a slot 61 to receive a fastening 62 applied to the swingle-tree 59.

The driver's seat 63 is located at the rear of the machine and is mounted upon bars 64 secured at their front ends to the main frame. The several levers 33, 55, and 45, as also the foot rest 10, are within convenient reach of the driver's seat to admit of their ready operation to effect the several adjustments in the operation of the machine. Pressure of the foot upon either foot rest 10 causes the standards 7 to turn and the drive wheels to be moved so as to direct the machine in the desired course. By reason of the intermediate connections between the two standards and between them and the beam 20 and draft bar 21, the ground wheels, hoe blades and cultivator gangs are turned simultaneously, with the result that the machine in all of its parts responds quickly to adjustment of the steering means. The hoe blades may be adjusted vertically independently of the cultivator shovels and the latter in turn may be raised or lowered independently of the hoe blades, thereby providing for regulating the depth of cultivation and hoeing and providing for throwing one or the other into or out of operation according as it may be desired either to cultivate or to hoe or to perform both operations at one time, thereby saving time and labor and facilitating the work and obviating the necessity for going over the field a second time after the plants have been cultivated to throw the earth towards the plants as when hoeing.

Having thus described the invention, what is claimed as new is:

1. In an implement of the character specified, the combination of a main frame comprising a transverse channel bar having longitudinal slots in its end portion, blocks fitted in the channel of said transverse bar and adjustable therein, standards pivotally connected with the blocks and provided with ground wheels, means connecting the standards to cause them to turn together and other means for turning the standards about to give proper direction to the machine.

2. In an implement of the character specified, the combination of a main frame, standards pivotally connected to the main frame to turn about a vertical axis, spindle arms projected from said standards and provided with ground wheels, longitudinal arms extended from the aforesaid standards, a cross bar connecting the longitudinal arms to cause the standards to turn together, a beam arranged in a different horizontal plane from the cross bar and provided with earth operating means, connecting means between the cross-bar and the said beam to cause both to move laterally at the same time, while admitting of independent vertical movement of the said beam and the earth operating means carried thereby, a draft bar having pivotal connection at its front end with the main frame and having rigid connection with the said beam, and means for exerting a yielding downward pressure upon the said beam to hold the earth operating means to the work and admit of the same clearing roots, stones and like obstructions.

3. In an implement of the character set forth, the combination of a main frame, a draft bar pivotally connected at one end of the main frame and provided with earth operating means, yielding means interposed between the main frame and the said draft bar to hold the earth operating means carried thereby to the work with a regulable force, other earth operating means having pivotal connection with said draft bar, and other yielding means interposed between the main frame and the last mentioned earth operating means to hold the same to the work.

4. In an implement of the character specified, the combination of a main frame, a draft bar, earth operating means connected with the draft bar, yielding means between the main frame and the draft bar to hold the earth operating means connected therewith to the work, a transverse support connected with said draft bar, earth operating means having lateral adjustable connection with said transverse support, yielding means interposed between the main frame and the last mentioned earth operating means to hold the same to the work, and a lever mounted upon said draft bar and having connection with the laterally adjustable earth operating means to effect either outward or inward movement thereof.

5. In an implement of the character specified, the combination of a main frame, steering mechanism therefor, a draft bar having connection with said steering mechanism to move laterally therewith and having independent vertical movement, a transverse rod connected to the draft bar and movable therewith, clevises having connection with both transverse rod and a part of the main frame and movable with reference to the latter, and earth operating means connected with the transverse rod and movable therewith.

6. In an implement of the character specified, the combination of a main frame, steering mechanism therefor, a draft bar having connection with said steering mechanism to move laterally therewith and having independent vertical movement, a transverse rod connected to the draft bar and movable therewith, clevises having connection with both a transverse rod and a part of the main frame and movable with reference to the latter, earth operating means connected with the transverse rod and movable therewith, and means for adjusting the earth operating means laterally upon said transverse rod and securing the same in the adjusted position.

7. In combination, a main frame, a draft bar, means for adjusting the draft bar both laterally and vertically, a transverse rod carried by the draft bar, clevis connection between the transverse rod and the main frame and movable with reference to the latter, earth operating means mounted upon the transverse rod to turn and slide thereon, an operating lever fulcrumed to the draft bar between its ends, links connecting the earth operating means with said operating lever upon opposite sides of its fulcrum to admit of lateral adjustment of the earth operating means, and other means between the earth operating means and the main frame for adjusting and varying the pressure for holding the earth operating means to the work.

8. In an implement of the character specified, the combination of a main frame provided with a pole or tongue, standards having pivotal connection with the main frame and provided with inwardly extended foot rests and outwardly extended arms upon which ground wheels are mounted, a cross bar connecting longitudinal arms of said standards, a draft bar, a beam carried by the draft bar, guide means between said beam and cross bar, hoe blades fitted to the said beam, a transverse rod carried by the draft bar, clevis connections between the transverse rod and a part of the main frame, cultivator gangs mounted upon the transverse rod both for lateral and vertical adjustment, means for adjusting the draft bar vertically, and other means for adjusting the cultivator gangs vertically, whereby the said cultivating means and hoe blades may be adjusted to different relative elevations, whereby the parts are adjusted simultaneously with the standards when moving the same to deflect the implement from a direct course.

In testimony whereof we affix our signatures in presence of two witnesses.

CHARLES H. CLARK. [L. S.]
HOWARD F. HAMILTON. [L. S.]

Witnesses:
BEDFORD A. W. BOYD,
CHARLES H. DINSMORE.